United States Patent
Young (10) Patent No.: US 7,477,986 B1
(45) Date of Patent: Jan. 13, 2009

(54) METHOD AND SYSTEM FOR CORRECTION OF NAVIGATIONAL ERRORS USING GENERAL SIGNALS OF OPPORTUNITY

(75) Inventor: Darrell L. Young, Falls Church, VA (US)

(73) Assignee: Raytheon Company, Waltham, MA (US)

( * ) Notice: Subject to any disclaimer, the term of this patent is extended or adjusted under 35 U.S.C. 154(b) by 604 days.

(21) Appl. No.: 11/070,549

(22) Filed: Mar. 1, 2005

(51) Int. Cl.
   *G01C 21/00* (2006.01)
   *G06F 17/13* (2006.01)
(52) U.S. Cl. .................. 701/207; 701/220; 701/300
(58) Field of Classification Search ............... None
   See application file for complete search history.

(56) References Cited

U.S. PATENT DOCUMENTS

| | | | | |
|---|---|---|---|---|
| 5,406,291 | A * | 4/1995 | Guerci et al. | 342/451 |
| 7,286,085 | B2 * | 10/2007 | Kolanek et al. | 342/424 |
| 7,305,303 | B2 * | 12/2007 | Soehren et al. | 701/221 |

* cited by examiner

*Primary Examiner*—Michael J. Zanelli
(74) *Attorney, Agent, or Firm*—Baker Botts L.L.P.

(57) ABSTRACT

According to one embodiment, a method for determining the location of an object includes determining a biased estimate of the location of the object for a plurality of locations and adjusting the estimated location of the object to address the bias based on a signal received at the object from an emitter of unknown location.

15 Claims, 3 Drawing Sheets

METHOD AND SYSTEM FOR CORRECTION OF NAVIGATIONAL ERRORS USING GENERAL SIGNALS OF OPPORTUNITY

TECHNICAL FIELD OF THE INVENTION

This invention relates generally to navigation systems, and more particularly to a method and system for correction of navigational errors using general signals of opportunity.

BACKGROUND

Inertial navigation systems (INS) generally involve a system accelerometers to maintain and update the current position and orientation of platforms in motion. Bias errors in accelerometers lead to integrated position errors.

Conventionally, utilizing information from an external navigation signal such as a global positioning system (GPS) can improve the position estimates by removing INS bias errors. The particular linkage between an INS and a GPS to obtain improved position and velocity estimates can vary. However, most methods utilize the known properties of the GPS signal, such as its chip rate and coding sequence along with satellite ephemeris data to augment the INS estimates. The dependency on GPS for precision navigation creates a vulnerability in cases of GPS denial (e.g. GPS outage or jamming).

A similar concept of using a "helper" signal is present in some differential GPS systems where a "helper station" in a known location makes estimates of the necessary corrections and forwards them to the nearby platform.

SUMMARY

According to one embodiment, a method for determining the location of an object includes determining a biased estimate of the location of the object for a plurality of locations and adjusting the estimated location of the object to address the bias based on a signal received at the object from an emitter of unknown location.

According to another embodiment of the invention, a method for determining the location of an object includes determining a biased estimate of the location of the object for a plurality of locations and adjusting the estimated location of the object to address the bias based on a signal received at the object from an emitter. Adjusting the estimated location includes determining, based on the received signal, a first derivative with respect to time of the frequency of the signal received at the object from an emitter. In addition, adjusting the estimated location of the object includes calculating, for a plurality of estimated bias corrections, a first derivative with respect to time the instantaneous frequency of the signal and comparing the plurality of the first calculated derivatives to the determined first derivative, and selecting one of the plurality of estimated bias correction that corresponds to a best match of the plurality of calculated first derivatives to the determined first derivative. The estimated location is adjusted based on the selected one of the estimated bias corrections.

Some embodiments of the invention provide numerous technical advantages. Some embodiments of the invention may benefit from some, none, or all of the below-described advantages. According to one embodiment, a system is provided that is capable of utilizing general signals of opportunity to correct bias errors in inertial navigation system designs so that the dependency on external GPS signal or other a priori known "helper" signal of known location and modulation type is eliminated. It is further beneficial, in some applications, to locate the unknown emitter.

According to another embodiment, a system and method for correcting navigational error is provided that does not require calibration or an expensive highly stable reference oscillator in either the transmitter or the receiver. This is due, in one embodiment, to the use of second order derivatives of a Doppler frequency, which is not susceptible to frequency offset or drift. This makes the embodiment suitable for use when an emitter is a general signal of opportunity. Typical emitters found in commercial transmitters do not have highly stable oscillators suitable for use in navigation reference signals. This problem is overcome in some embodiments so that they can be used.

Certain embodiments of the present invention can also isolate and remove higher order terms of frequency or drift. Furthermore, in a highly maneuvering vehicle with sufficient dynamics to excite higher Doppler differential terms, certain embodiments of the present invention can operate to estimate bias corrections and locate emitters in a reduced amount of time. Thus, certain embodiments of the invention are highly applicable to hide-speeds, unmanned, highly maneuverable platforms such as supersonic missiles capable of performing high-G turns.

Another advantage of some embodiments of the invention is the provision of a system and method that is insensitive to frequency instability errors, including frequency offset and drift between the signal of opportunity and the receiver on the moving platform. For this reason, certain methods and systems according to the teachings of the invention are applicable to a wide variety of signal types heretofore considered unsuitable as a navigational aid.

Other technical advantages will be readily apparent to one skilled in the art.

BRIEF DESCRIPTION OF THE DRAWINGS

For a more complete understanding of the present invention and its advantages, references now made to the following description, taken in conjunction with the accompanying drawings, in which.

DETAILED DESCRIPTION OF EXAMPLE EMBODIMENTS

Embodiments of the present invention and its advantages are best understood by referring to FIGS. 1 through 7 of the drawings, like numerals being used for like and corresponding parts of the various drawings.

Certain embodiments of the present invention address errors in trajectory calculation when using a navigation system with biases, such as an inertial navigation system. In general, errors are reduced by comparing measured Doppler-derivative profiles to general signal-of-opportunity profiles from a candidate location. The Doppler-derivative profile measurements are made and compared to candidate predicted profiles. Intermediate steps may include estimation of the combined frequency drift between the transmitter and the receiver and estimation of the emitter's location.

The teachings of the invention are applicable to any platform utilizing a navigation system, such as inertial navigation systems, including but not limited to projectiles, guided weapons, flying craft (manned or unmanned), spacecraft, or underwater vehicles in motion. The general signal-of-opportunity is not limited to radio waves but can include sound waves of sufficient duration and characteristics and other suitable types of waves.

Figure 1:
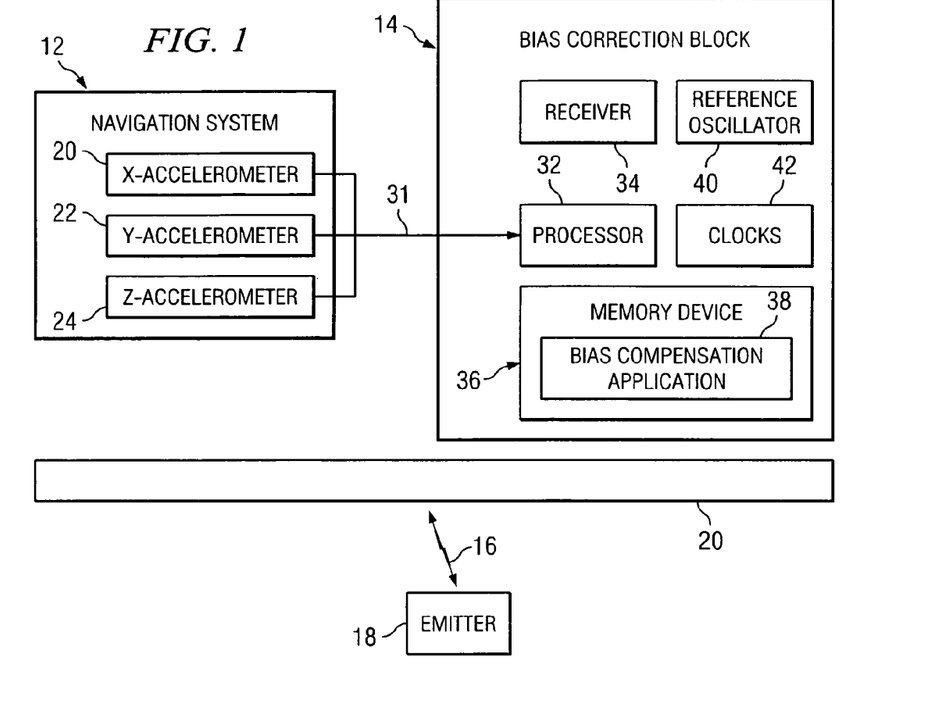
FIG. 1 is a block diagram illustrating a system for determining the location of an object according to the teachings of the invention.

FIG. 1 is a block diagram illustrating a navigation system 10 according to the teachings of the invention. Navigation system 10 includes an inertial navigation system 12 and an associated bias correction block 14. Inertial navigation system 12 may be subject to biases that would result in incorrect position and velocity information for navigation system 10. The teachings of the invention recognize that general signals-of-opportunity 16 may be received from an emitter 18 that can be used to correct an error in biases in INS 12, even if the location of emitter 16 is unknown. Navigation system 10 is located on a moving platform 20, such as a projectile, a guided weapon, aircraft, spacecraft, or watercraft.

In general, a Doppler shift associated with general signal-of-opportunity 16 is utilized that is representative of the relative velocity between emitter 18 and navigation system 10 to correct for biases in navigation errors. A problem that would occur in measuring such a Doppler frequency is separating the artifacts of mismatch in frequency between transmitter and receiver from the genuine Doppler effect that comes about through relative motion. Another related difficulty is mistaking identification of relative frequency instability in either the transmitter or the receiver, or both, for that of the Doppler effect.

According to the present invention, system 10 adjusts for bias in inertial navigation system 12 by measuring the carrier frequency of general signal-of-opportunity 16 while platform 20 is moving. The dynamic motion profile causes the received frequency to change. The changing frequency profile is used to estimate the location of emitter 18, frequency drift rates, and biases. In particular, higher order derivatives of the Doppler frequency may be used to insulate system 10 from frequency instabilities in the emitter and transmitter. Because each higher order derivative introduces some noise, certain embodiments of the present invention utilize first derivatives of the instantaneous frequency shift in certain instances and second derivatives of the instantaneous frequency shift in others to provide a good balance between introduction of noise and robustness to frequency offset interrupt.

Inertial navigation system 12 may be any navigation system operable to determine an estimate of the location of a moving object. In this example, navigation system 12 is an inertial navigation system; however, the teachings of the invention are applicable to any such navigation system. In this embodiment, inertial navigation system includes accelerometers 20, 22, and 24 operable to determine an acceleration in the x, y, and z directions. Integration of signals from accelerometers 20, 22, and 24 may result in position and velocity information for navigation system 10 and associated moving platform 20. Signals from accelerometers 20, 22, and 24 may be provided over link 31 to a processor 32 in bias correction block 14.

Bias correction block 14 includes a receiver 34 operable to receive a frequency and phase, and in particular, a frequency and phase associated with general signal-of-opportunity 16. In one embodiment, receiver 34 converts frequency and phase into a coherent reference signal by passing the general signal of opportunity 16 through a non-linearly such as a squaring operation equivalent to multiplying a complex signal by its conjugate, a quadrupling operation, or a delay and multiply operation, and then filtering, such as through narrow band filtering. Receiver 34 may be a radio receiver in one embodiment and may employ a super-heterodyne type down conversion followed by a baseband or passband sampling of the received signal by an analog-to-digital converter. Associated with processor 32 is a memory device 36 which may store a bias correction application 38. Bias correction application 38 may be programmed with suitable instructions for performing bias correction according to the teachings of the invention, as described in greater detail below in conjunction with FIGS. 2 through 7. Associated with receiver 34 and processor 32 is a reference oscillator 40 for comparison to the received general signal-of-opportunity 16. In addition, a clock 42 is utilized in such a comparison.

In operation, inertial navigation system 12 generates estimated position and velocity information for moving platform 20. This estimate may be corrected by bias correction block 14 through use of general signal-of-opportunity 16 emitted from an emitter 18, which may be of unknown location. Receiver 34 receives general signal-of-opportunity 16 and, in conjunction with processor 32, bias correction application 38 generates updated position and velocity information for moving platform 20 based on derivatives of instantaneous frequency associated with general signal-of-opportunity 16. Example steps associated with the generation of updated position and velocity information is described in greater detail below in conjunction with FIGS. 2 through 7.

Figure 2:
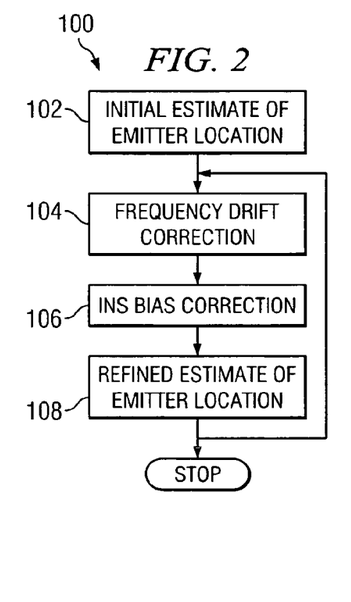
FIG. 2 is a flowchart illustrating a method for determining the location of an object according to the teachings of the invention.

FIG. 2 is a flowchart illustrating a method for adjusting a determined location of a moving platform where the original determination is subject to bias errors. In general, the bias correction of certain embodiments of the present invention may be based on moving platform and an emitter in conjunction with frequency drift correction. Frequency drift correction refers to correction for drift in frequency between the emitter associated with the general signal-of-opportunity, such as emitter 18, and a reference oscillator, such as reference oscillator 40. Although the method of FIG. 2 is described with reference to the system of FIG. 1, the method may be implemented by other suitable systems. A frequency drift correction may be based on an estimate of the location of emitter 18.

Thus, method 100 begins with a step 102 of generating an initial estimate of an emitter location. Example steps associated with one method for making an initial estimate of the location of emitter 18 are described in greater detail below in conjunction with FIG. 4. Based upon the estimate of the emitter location, a frequency drift correction factor may be determined at step 104. As described above, a frequency drift correction factor addresses errors that may be introduced because of drift between reference oscillator 40 and emitter 18. Based upon the initial estimate of the emitter location determined at step 102 and the frequency drift correction factor determined at step 104, a bias correction may be determined for inertial navigation system 12 at step 106. Example steps associated with this determination are described in greater detail below in conjunction with FIG. 6. Step 106 results in updated position and velocity information which may then be used at step 108 to calculate a refined estimate of the location of emitter 18. Example steps associated with step 108 of refining the estimate of the emitter location are described in greater detail below in conjunction with FIG. 7. This refined emitter location may then be used at step 104 and the process may be repeated as often as desired with updated information used at each cycle, resulting in improved location and velocity information for a moving object.

Figure 3:
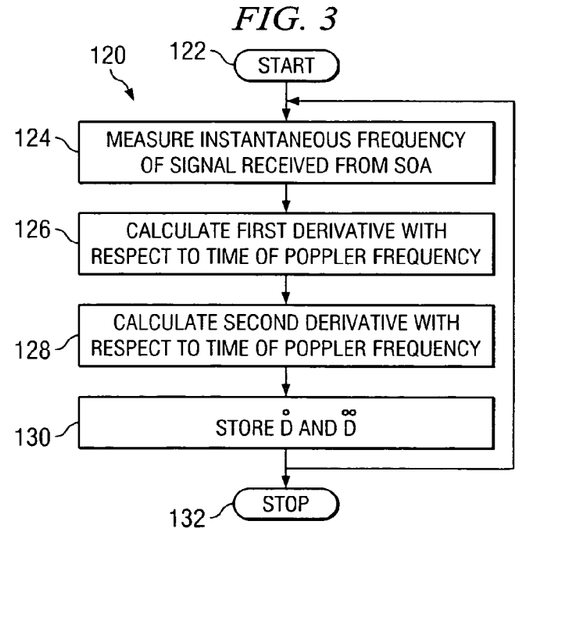
FIG. 3 is a flowchart illustrating example details associated with a step of FIG. 2 associated with determining first and second derivatives of instantaneous frequency.

FIG. 3 is a flowchart illustrating a method 120 for determining first and second derivatives of instantaneous frequency associated with a general signal-of-opportunity, such as signal 16. As described above, the teachings of the invention recognize that using derivatives of the instantaneous frequency associated with general signal-of-opportunity 16 may be beneficial because the derivatives are less susceptible to errors often associated with measuring instantaneous frequency. Thus, each of the steps 102, 104, 106, and 108 involved in calculating a bias correction may utilize one or more derivatives of this Doppler frequency. According to one embodiment of the invention, bias correction application 38 performs method 120 in determining these first and second derivatives.

The method begins at step 122. At step 124 the instantaneous frequency of general signal-of-opportunity 16 is measured. It will be recognized that if there is relative movement between platform 20 and emitter 18, the measured frequency will correspond to the actual frequency of a signal emitted by emitter 18 in combination with instantaneous frequency associated with the relative movement between emitter 18 and platform 20. In one example, the instantaneous measured frequency can be estimated by using a conventional FM demodulator. In one example, a least squares fit to instantaneous phase is utilized because of its superior noise immunity. The slope, or derivative, of the instantaneous phase is an estimate of the instantaneous frequency. The difference due to platform motion between the instantaneous frequency of carrier and the true frequency of the carrier is the Doppler frequency.

As described above, a problem in using the Doppler frequency is that there can be substantial frequency offset and drift between the receiving and emitter systems. The offset frequency bias and drift can be mistaken for the Doppler frequency. According to the teachings of the invention, this problem is addressed by utilizing first and second derivatives of the Doppler shift. Because the frequency offset is a constant it does not appear on the first derivative. Similarly, the frequency drift does not appear on the second derivative.

The measured instantaneous frequency determined at 124 may be based on and may be collected over a period of time at a number of sub-intervals. In one embodiment, the sub-intervals last one second in time, which is particularly suitable for projectiles with speeds on the order of 300 meters per second. More rapidly maneuvering profiles or platforms use smaller intervals of time. In one particular embodiment the number of sub-intervals is a minimum of four, with no maximum number of intervals. In one embodiment, the signal collection may include a step of carrier recovery. Carrier recovery reduces the signal bandwidth and is accomplished though a variety of known methods such as squaring BPSK signals, or quadrupling QPSK signals.

At step 126, the first derivative with respect to time of the instantaneous Doppler frequency is determined. This removes any dependence on frequency bias. Determining the first derivate may be performed according to any suitable technique. In one embodiment, the first derivative is computed by taking the difference between adjacent subintervals. At step 128 the second derivative of the instantaneous frequency is determined, removing the dependence on any frequency shift. The second derivative may be calculated according to any suitable technique. In one embodiment, the second derivative is calculated by taking the difference between the current and adjacent, prior subinterval first derivate Doppler estimate and the current sub-interval's first derivative Doppler estimate. For each step in time, the first and second derivatives are stored as indicated at step 130. Given sufficient maneuvering by the platform, the measured profile of Doppler-derivatives corresponds to a unique location of emitter 18. This location can be found by comparing the measured profile to synthetic profiles generated for candidate locations, as described in greater detail below in conjunction with FIG. 4.

Figure 4:
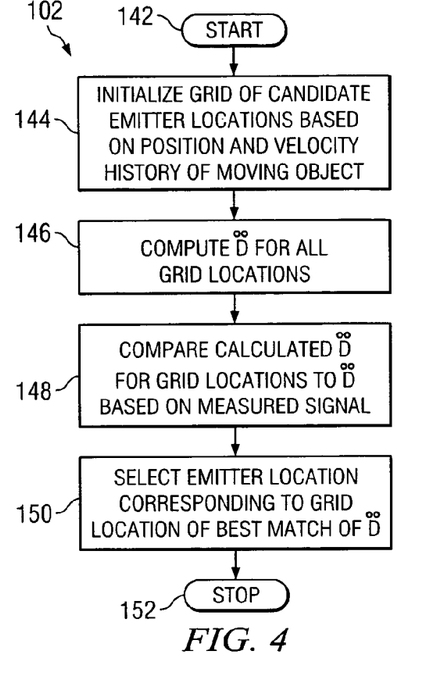
FIG. 4 is a flowchart illustrating example details of a portion of the method of FIG. 2 associated with an initial estimate of the emitter location.

FIG. 4 is a flowchart illustrating example steps associated with step 102 of determining an initial emitter location based on comparison of measured Doppler-derivative profiles to synthetic Doppler-derivative profiles generated for a plurality of candidate emitter locations. The method begins at step 142. At step 144, a grid of candidate emitter locations is initialized. This initial grid may be based upon the position and velocity information determined by the associated navigation system, such as system 12. For each candidate location, the second derivative of the Doppler frequency synthetic profile is calculated. This calculation may be performed by finding the location estimate such that the difference between a predicted instantaneous frequency derivative and the measured instantaneous frequency derivative is minimized. The predicted instantaneous frequency is based on inertial measurements relative to the candidate emitter location. It also includes the frequency bias between the emitter's local oscillator and the receiver's. The first derivative of the predicted instantaneous frequency does not contain the bias term but does include bias rate (drift). The $2^{nd}$ derivative does not include a time varying contribution due to drift, but only a constant offset and the contribution due to own-ship motion (assuming stationary emitter).

The initial estimate of emitter location is performed according to the following formula.

$$\min_{\substack{w.r.t. \\ x_e, y_e, z_e}} \sum_{t=0}^{T} [\ddot{f}_p(t) - \ddot{f}_m(t)]^2$$

$\ddot{f}_p(t) = d^3(Im(\ln(e^{jarg})))/dt^3$ 2nd derivative of predicted instantaneous frequency.

$\dot{f}_p(t) = d^2(Im(\ln(e^{jarg})))/dt^2$ derivative of predicted instantaneous frequency The predicted instantaneous frequency, $f_p(t)$ is, $f_p(t) = d(Im\{\ln(e^{jarg})\})/dt$, arg is given by, $$\arg = 2\pi\left[(f+f_b)t + \frac{f_d}{2}t^2 + \bar{d}(t)\right]$$

f is carrier the frequency,
$f_b$ is the frequency bias,
$f_d$ is the frequency drift, The independence of frequency bias and drift in the $2^{nd}$ derivative of the predicted frequency can be seen by differentiating the arg term twice which leaves $2\pi(f_d+\bar{d}(t))$.

$\bar{d}(t)$ is the instantaneous distance between the emitter and the receiving platform in wavelengths, $$\bar{d}(t) = \frac{\sqrt{(x_e-x(t))^2 + (y_e-y(t))^2 + (z_e-z(t))^2}}{\lambda}$$

where, $x_e$, $y_e$, $z_e$ are the emitter's coordinates and $x(t)$, $y(t)$ and $z(t)$ are the instantaneous coordinates of the receiving platform. All quantities comprising $\bar{d}(t)$ are estimated, $$\hat{\bar{d}}(t) = \frac{\sqrt{(\hat{x}_e-\hat{x}(t))^2 + (\hat{y}_e-\hat{y}(t))^2 + (\hat{z}_e-\hat{z}(t))^2}}{\hat{\lambda}}.$$

The own-ship coordinates are estimated by integrating accelerometer measurements as shown in the following inertial equations.

$\hat{v}_x(t) = \int(a_x(t)+\alpha_x)dt + C_{x1}$ $\hat{x}(t) = \int \hat{v}_x(t)dt + C_{x2}$ $\hat{v}_y(t) = \int(a_y(t)+\alpha_y)dt + C_{y1}$ $\hat{y}(t) = \int \hat{v}_y(t)dt + C_{y2}$ $\hat{v}_z(t) = \int(a_z(t)+\alpha_z)dt + C_{z1}$ $\hat{z}(t) = \int \hat{v}_z(t)dt + C_{z2}$ $a_i(t)$ is the measured acceleration in the $i^{th}$ dimension. $\alpha_i$ is the accelerometer bias in the $i^{th}$ dimension. Accelerometer bias causes inaccurate estimates of platform locations.

Figure 8:
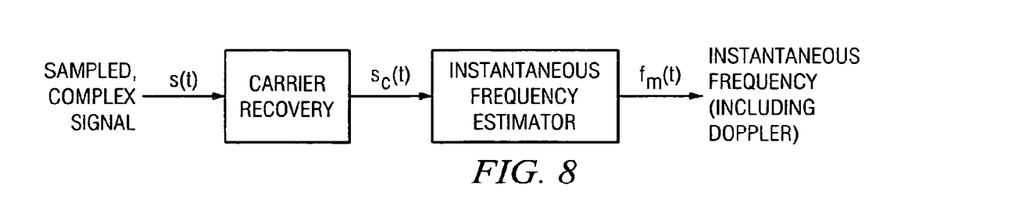
FIG. 8 is a block diagram illustrating instantaneous measured frequency derived after a carrier recovery has been performed on the received signal.

$\ddot{f}_m(t)$ is the 2nd derivative of the instantaneous measured frequency derived after a carrier recovery has been performed on the received signal as shown in the FIG. 8.

$\ddot{f}_m(t) = d^3(Im(\ln(s_c(t))))/dt^3$ measured 2nd derivative of instantaneous frequency.

$\dot{f}_m(t) = d^2(Im(\ln(s_c(t))))/dt^2$ measured derivative of instantaneous frequency.

$f_m(t) = d(Im(\ln(s_c(t))))/dt$ measured instantaneous frequency.

The measured and candidate profiles are compared at step 148, and a mean square error is calculated for each candidate profile. The candidate location with the least mean square error is chosen as the initial estimate of the emitter location at step 150. The initial location method concludes at step 152.

Thus, according to the teachings of the invention, an initial estimate of the emitter location may be determined based on comparing measured derivatives of the instantaneous frequency to synthetic profiles of such derivatives generated for candidate emitter locations. The emitter location corresponding to the candidate emitter location that results in the least error is selected. This initial estimate of the emitter location may be used at step 104 in calculating a frequency drift correction, as described in greater detail below in conjunction with FIG. 5.

Figure 5:
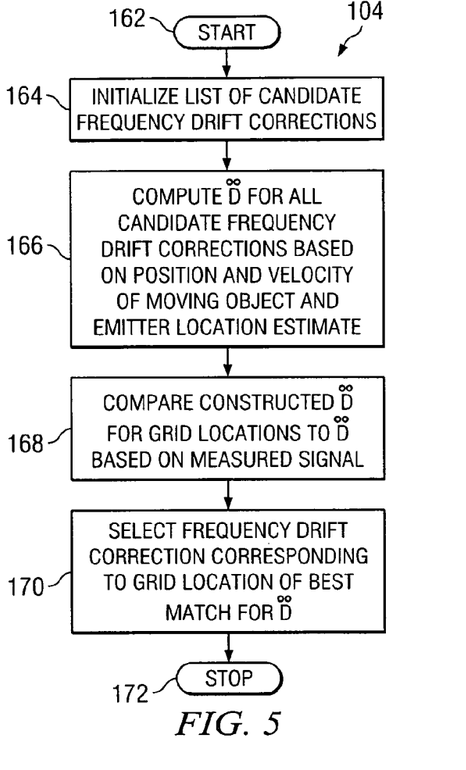
FIG. 5 is a flowchart illustrating additional details of yet another portion of the method of FIG. 2 associated with frequency drift correction.

FIG. 5 is a flowchart illustrating example steps associated with step 104 of calculating a frequency drift correction factor. The method begins at step 162. At step 164 an initial list of candidate frequency drift correction factors is generated. This initial list may be determined based on the expected drift rate of common oscillators over the interval and frequency of interest. The most common oscillators are based on quartz and are generally assumed to drift 1 part-per-million-per-second. For example, a quartz based oscillator at 300 MHz may drift +/−300 Hz in one second. For this situation, the list of trial corrections should span −300 to +300 Hz in increments as small as possible within the compute capability of the particular design. Larger increments can be tolerated by interpolating to find the minimum between points. The effect of the interpolation error on system performance depends on the changing geometry. This initial list may be based upon specifications provided by the manufacturer of an associated oscillator, such as reference oscillator 40. The method continues at step 166 in which a second derivative of the instantaneous frequency is calculated for all candidate frequency drift correction factors. The second derivative is calculated based upon the position and velocity information for moving platform 20 and based on the initial estimate of the emitter location according to the following equation, introduced above:

$\ddot{f}_p(t) = d^3(Im(\ln(e^{j\arg})))/dt^3$

At step 168 the constructed second derivative of the instantaneous frequency for each list entry is compared to the second derivative of the instantaneous frequency based on the measured signal (determined at step 128 of FIG. 3). At step 170 the frequency drift estimate corresponding to the list entry with the best match is selected according to the following formula:

$$\min_{w.r.t.f_d} \sum_{t=0}^{T} \left[\ddot{f}_p(f_d,t)\big|_{x_e,y_e,z_e} - \ddot{f}_m(t)\right]^2$$

The frequency drift correction is the negative of the frequency drift estimate so that by adding the correction the frequency drift is removed. In one embodiment, the best match is the profile having the least mean square error. The method concludes at step 172.

Thus, according to one aspect of the invention, a frequency drift correction factor, which addresses errors in the frequency difference between transmitter and receiver, may be calculated by calculating a second derivative of an instantaneous frequency based upon candidate frequency drift corrections and comparing the calculated second derivatives to a second derivative of instantaneous frequency based upon a measured signal. The selected frequency drift correction factor may be utilized at step 106 in correcting the INS position information, as described in greater detail below in connection with FIGS. 6A and 6B.

Figure 6A:
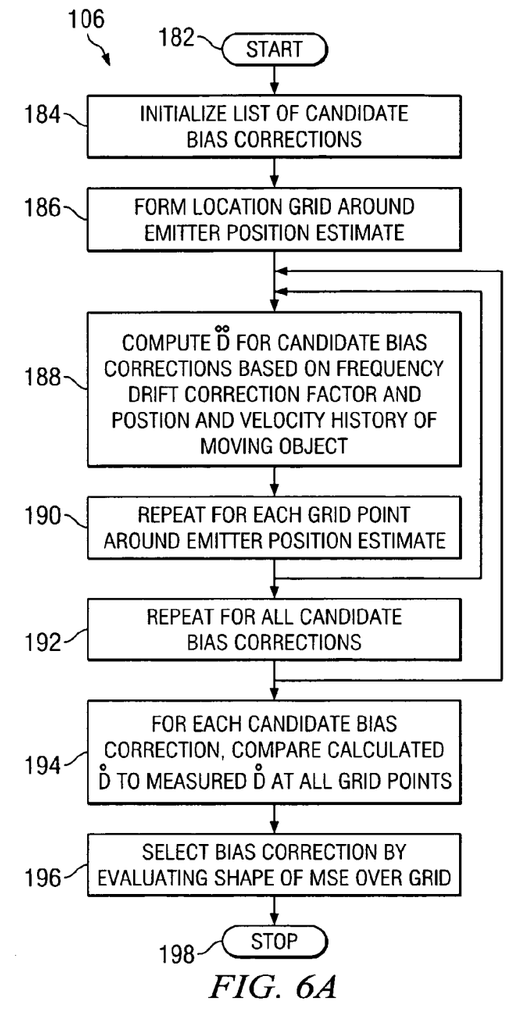
FIG. 6A is a flowchart illustrating additional details of yet another portion of the flowchart of FIG. 2 associated with INS bias correction.

FIG. 6A is a flowchart illustrating example steps associated with step 106 of correcting the INS bias. The method begins at step 182. At step 184 a list of initial candidates of bias corrections is generated. The range of the list depends on the accuracy to which the constant of integration from previous measurement cycles is known. In this case, the range of the list is determined by the maximum accelerometer bias of the component being used. The maximum bias can be measured, apriori and is often provided by the component manufacturer. This case, where the constant of integration is known from a previous measurement cycle, could occur when the platform is transitioning from an area of GPS availability to one of GPS denial. In areas of GPS availability, the constant of integration and accelerometer bias can be estimated as is well known in the art. It is in the first and subsequent measurement cycles where GPS is denied that the present invention estimates the accelerometer bias. The list of bias corrections must be expanded if it is to include the effects of unknown constant of integration.

At step 186 a location grid around the calculated emitter position is generated. The size of the grid is determined by subsequent processing that computes an area around a minimum. The grid must be large enough to contain the included area. Making the grid larger than this does not accrue any additional benefit and costs unnecessary computations. A typical implementation of the invention would use a grid of 200 meters by 200 meters for an initial evaluation and then adjust so that the grid encloses the area without excess. That is, if the contour of the area cannot be closed, then the grid is enlarged. On the other hand, if the point of nearest approach of the area contour to the grid edge is large, then the grid size is reduced or alternatively the grid is computed from the center out and computation ceases once the contour is closed.

The area is region where a cost function is below a certain threshold. Thus, the size of the grid is dependent on the threshold. Greater thresholds will require larger grids to contain the included area. If the selected threshold is changed, the grid size should be tested to ensure that it is large enough to contain the area for the bias correction under test. The size of the area is dependent on the accuracy of the estimated parameters including emitter location and frequency drift. Because the overall invention iteratively improves the parameter estimates, the size of the grid can be decreased as the parameters are more accurately estimated because the included area decreases in size for well estimated parameters.

The granularity of the grid is determined by the available compute power and time available to make the bias correction estimation. The finer the granularity the more accurate the bias correction. Granularity of 30×30, so that 900 points are evaluated for each bias correction candidate, is adequate for typical error budgets.

The center of the grid is the emitter location estimate, however, the center of the included area is the minimum point of the grid which may not be the same as the emitter location estimate. Then, for a given candidate bias correction the first derivative of the Doppler frequency is calculated. This first derivative is based on the frequency drift correction factor determined at step 104, and the position and velocity history of the moving object determined by INS 12, in one example. This first derivative calculation is repeated for each point on the grid as indicated by step 190 in reference numeral 192. Steps 188 and 190 are repeated for each candidate bias correction factor, as indicated at step 192.

At step 194, for each candidate bias correction, the calculated first derivative is compared to the first derivative calculated at step 126 of FIG. 3 at all points. A measured profile is subtracted from the candidate profiles to yield a grid of mean square errors. This results in a grid of mean square errors for each candidate INS bias correction. In this particular embodiment, instead of seeking to minimize a cost function, the selection of a bias correction is based on the shape of the resulting cost function, as indicated at step 196. Based on such a cost function, the appropriate bias correction factor is selected according to the following formula.

$$\min_{w.r.t.\ \alpha_x, \alpha_y, \alpha_z} \text{Area}(\hat{\alpha}_x, \hat{\alpha}_y, \hat{\alpha}_z) \cong N, \alpha_x, \alpha_y, \alpha_z$$

are estimated accelerometer biases,

N=number of points $(x_i, y_i, z_i)$ such that $\text{MSE}(x_i, y_i, z_i) < C \cdot \text{MSE}_{min}$ $$MSE_{\min} = \min_{w.r.t. x_m, y_m, z_m,} \sum_{t=0}^{T} [\dot{f}_p(x_m, y_m, z_m, t)|_{f_d} - \dot{f}_m(t)]^2$$

The $x_i$, $y_i$ points are in the gridded plane at the constant elevation chosen to be the elevation of the estimated emitter location.

The method concludes at step 198. Example steps associated with selecting the appropriate bias correction factor for step 196 are described in greater detail below in conjunction with FIG. 6B.

Figure 6B:
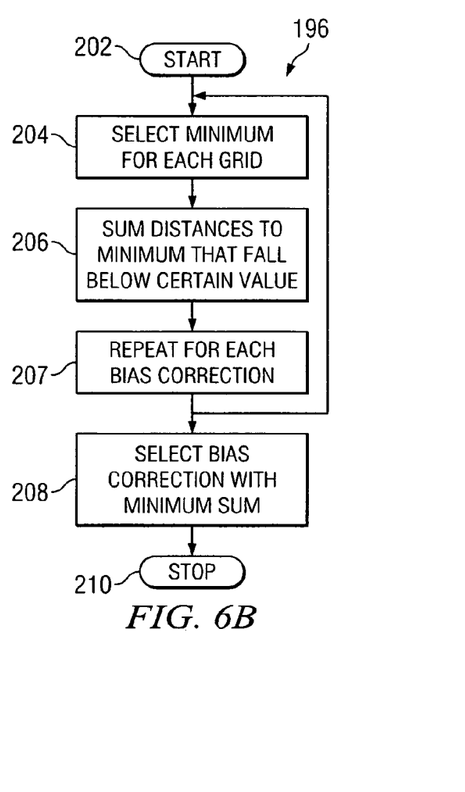
FIG. 6B is a flowchart illustrating example details of a portion of the method of FIG. 6A associated with INS bias correction.

FIG. 6B illustrates a method 196 for selecting a bias correction factor from a plurality of possible bias correction factors. The method begins at step 202. At step 204 a minimum for each grid is found. The distance from it to all grid points with values less than C times the mean square error is found and summed, as indicated by steps 206 and 207. C is a constant with a value of 1.05, in one embodiment. The INS correction with the minimum sum is chosen at step 208. Method 196 concludes at step 210.

Thus, an INS correction factor may be determined based upon a list of candidate bias correction factors and a comparison made between resulting generated first derivatives of the Doppler frequency and first derivatives of the Doppler frequency determined at step 126 of FIG. 3. The bias correction factor often takes the form of $-\hat{\alpha}_i$ for the $i^{th}$ dimension and may be used to correct the position and velocity information provided by INS 12 by the following formulas:

$$\hat{v}_x(t) = \int (a_x(t) + \alpha_x - \hat{\alpha}_x) dt + C_{x1}$$

$$\hat{x}(t) = \int \hat{v}_x(t) dt + C_{x2}$$

$$\hat{v}_y(t) = \int (a_y(t) + \alpha_y - \hat{\alpha}_y) dt + C_{y1}$$

$$\hat{y}(t) = \int \hat{v}_y(t) dt + C_{y2}$$

$$\hat{v}_z(t) = \int (a_z(t) + \alpha_z - \hat{\alpha}_z) dt + C_{z1}$$

$$\hat{z}(t) = \int \hat{v}_z(t) dt + C_{z2}$$

Figure 7:
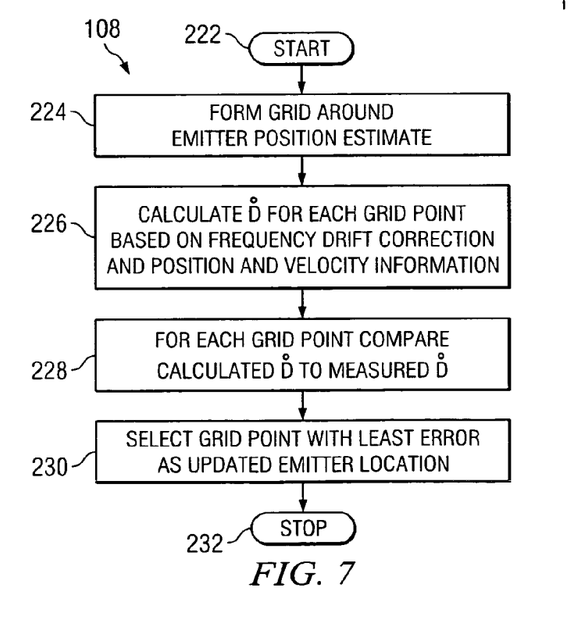
FIG. 7 is a flowchart illustrating example steps of yet another portion of the method of FIG. 2 associated with refined emitter location determination.

The revised position and velocity information may be utilized to obtain a refined estimate of the emitter location as described in greater detail below in conjunction with FIG. 7. FIG. 7 is a flowchart illustrating example details associated with step 108 for calculating a refined estimate of the location of the emitter. The method begins at step 222. At step 224 a grid around the position estimate is generated. The size of the grid at its largest extent is bounded by the radio horizon. This large grid must be used to first acquire the emitter. Subsequent measurement cycles use smaller grids. The size of the grid must be large enough to contain the minimum of the cost function. There is no benefit for grids larger. The finer the granularity of the grid, the greater accuracy. Interpolation can be used between grid points as a substitute for granularity, however, the granularity of the grid must be fine enough to detect the minimum. If no minimum is detected, the grid should be made more fine. The declaration of a minimum detection is according to standard statistical principle where the minimum is compared to the deviations in the surface. The detection threshold should be set to maximize the probability of detection and minimize the probability of false alarm.

At step 226 the first derivative of the Doppler frequency is calculated for each grid point based upon the frequency drift correction factor and position and velocity information for the moving object. This calculation may be determined according to the following formula:

$$f_p(t) = d^2(Im(\ln(e^{jarg})))/dt^2 \text{ derivative of predicted instantaneous frequency}$$

The derivative of the predicted instantaneous frequency, $f_p$, is computed using the corrected positions and the most recent frequency drift estimate.

At step 228, for each grid point, a comparison is made of the calculated first derivative of the instantaneous frequency to the first derivative of the instantaneous frequency determined at step 126 of FIG. 3. At step 230 the grid point with the least mean square error is selected as an updated emitter location as follows:

$$\min_{w.r.t.\hat{x}_e,\hat{y}_e,\hat{z}_e} \sum_{t=0}^{T} \left[ \dot{f}_p(\hat{x}_e, \hat{y}_e, \hat{z}_e, t) \big|_{f_d} - \dot{f}_m(t) \right]^2$$

The method concludes at step 232.

The first derivative of the Doppler frequency is used in the calculation of the refined emitter location because it is insensitive to bias in carrier frequency estimation. However, the methods described to estimate the frequency drift rate can be modified to estimate the frequency bias so that the Doppler frequency can be used. Using the Doppler frequency instead of a Doppler-derivative has more noise immunity.

While general techniques have been described above with reference to calculating a first derivative with respect to a time instantaneous frequency, a variety of techniques may be utilized. For example, one technique may involve converting the received signal into a coherent reference signal utilizing processes such as, but not limited to, 1) filtering a carrier component for signals such as DSB-AM; 2) performing an mth order non-linear operation to collapse the spectrum into a carrier wave such as can be done for digital modulations (e.g., m-ary PSK); 3) using 2nd order non-linear operators to strengthen and recover the carrier in DSB-AM; 4) selecting sub-intervals of non-modulation such as can be found for FM voice where the unmodulated carrier is present between utterances; 5) recovering the suppressed, but still present RF carrier in SSB and DSB-SC; 6) selecting a sub-interval where the pure carrier is known to be present as can be found during the non-amplitude modulated portions of TV broadcast signals; and 7) selecting and fine filtering the pilot signal as can be done with HDTV signals.

The technique of calculating the first derivative with respect to a time instantaneous frequency may also involve performing a first-order, least-squares fit to the instantaneous phase of the coherent reference signal. The least-squares fit performs an averaging function that may increase the effective SNR or accuracy of the instantaneous frequency measurement and reduce the number of samples processed in subsequent steps. The time span over which the fit is performed may be such that the instantaneous frequency is nearly constant over the interval. That is, the interval may be less when the platform is performing maneuvers or is near the emitter. For ballistic mortar arcs the interval can be as large as 500 milliseconds. Higher speed platforms that induce increased frequency slewing due to motion may adjust the fit interval so that the instantaneous frequency change due to motion is negligible during the averaging process. "Negligible" in this context may generally refer to a frequency change due to motion being roughly the same magnitude as the instantaneous frequency measurement error due to noise.

Another method of obtain the instantaneous frequency of the coherent reference is to process the signal using a conventional FM demodulator followed by low-pass filtering and decimation. In this method, the bandwidth of the low-pass filter may be set wide enough to pass the frequency changes due to motion. Higher order derivatives of frequency can be obtained through a variety of known signal processing techniques. A simple method is to take the difference of adjacent samples. Alternatively, more elaborate differentiating filters can be used.

Although the present invention has been described with several embodiments, a myriad of changes, variations, alterations, transformations, and modifications may be suggested to one skilled in the art, and it is intended that the present invention encompass such changes, variations, alterations, transformation, and modifications as they fall within the scope of the appended claims.

What is claimed is:

1. A method for determining the location of an object comprising:
   determining a biased estimate of the location of the object for a plurality of locations;
   adjusting the estimated location of the object to address the bias based on a signal received at the object from an emitter comprising:
   determining, based on the received signal, a first derivative with respect to time of the instantaneous frequency of the signal received at the object from the emitter;
   calculating, for a plurality of estimated bias corrections, a first derivative with respect to time, of the instantaneous frequency of the signal;
   comparing the plurality of calculated first derivatives to the determined first derivative and selecting one of the plurality of estimated bias corrections that corresponds to a best match of the plurality of calculated first derivatives to the determined first derivative; and
   adjusting the estimated location of the object based on the selected one of the estimated bias corrections.

2. The method of claim 1, wherein calculating, for a plurality of bias corrections, a first derivative with respect to time, of the instantaneous frequency of the signal comprises calculating a first derivative based at least in part on a frequency drift correction factor indicative of the amount of drift of a carrier frequency of the emitter relative to a local oscillator frequency associated with the object.

3. The method of claim 2, and further comprising calculating a frequency drift correction factor by:
   determining, based on measured data, a second derivative with respect to time of the instantaneous frequency of the signal received at the object from the emitter;
   calculating, for a plurality of estimated frequency drift correction factors, a second derivative with respect to time of the instantaneous frequency of the signal; and
   comparing the plurality of calculated second derivatives to the determined second derivative in selecting one of the plurality of estimated frequency drift correction factors that corresponds to a best match of the plurality of calculated second derivatives to the determined second derivative.

4. The method of claim 3, wherein calculating, for a plurality of estimated frequency drift correction factors, a second derivative with respect to time of the instantaneous frequency of the signal comprises calculating a second derivative based at least in part on an estimated emitter position.

5. The method of claim 4, and further comprising calculating an estimated emitter position by:
- calculating, for a plurality of candidate estimated emitter positions, a second derivative with respect to time of the instantaneous frequency of the signal received at the object from the emitter; and
- comparing the plurality of second derivatives to the determined second derivative in selecting as the calculated estimated emitter position one of the plurality of candidate estimated emitter positions that corresponds to a best match of the plurality of calculated second derivatives and the determined second derivative.

6. The method of claim 4, and further comprising calculating a refined estimate of the emitter location and repeating, based on the refined estimate of the emitter location, the steps of calculating a frequency drift correction factor and adjusting the estimated location of the object to address the bias.

7. The method of claim 6, wherein calculating a refined estimate of the emitter position comprises:
- calculating, for a plurality of candidate refined estimates of emitter position, a first derivative with respect to time of the instantaneous frequency of the signal received at the object from the emitter, the calculation based at least in part on the adjusted estimated location of the object; and
- comparing the plurality of first derivatives to the determined first derivative in selecting, as a refined estimate of the emitter position, one of the plurality of candidate refined estimates of emitter position that corresponds to a best match of the plurality of calculated first derivatives to the determined first derivative.

8. The method of claim 6, and further comprising repeating a plurality of times the steps of calculating a refined estimate of the emitter position and repeating, based on the refined estimate of the emitter location, the steps of calculating a frequency drift correction factor and adjusting the estimated location of the object to address the bias.

9. The method of claim 1, wherein determining a biased estimate of location comprises determining a biased estimate by a three-axis accelerometer.

10. The method of claim 1, wherein the biased estimate is biased based on one of an accelerometer bias error.

11. The method of claim 1, wherein the signal received at the object from an emitter comprises amplitude and phase information received by a radio receiver.

12. The method of claim 1, wherein determining, based on measured data, a first derivative with respect to time, of the instantaneous frequency comprises:
- converting the received signal into a coherent reference signal;
- performing a first-order, least-squares fit to the instantaneous phase of the coherent reference signal.

13. A system for determining bias errors in an inertial navigation system of a moving object utilizing at least one general signal-of-opportunity comprising:
- a plurality of accelerometers for measuring the acceleration of the moving object;
- a receiver operable to measure a phase and amplitude of a signal received from an emitter;
- a computer system operable to:
  - determine a biased estimate of the location of the object for a plurality of locations; and
  - adjust the estimated location of the object to address the bias based on a signal received at the object from an emitter of unknown location, wherein adjusting the estimated location of the object comprises:
- determining a biased estimate of the location of the object for a plurality of locations;
- adjusting the estimated location of the object to address the bias based on a signal received at the object from an emitter comprising:
  - determining, based on data of the signal, a first derivative with respect to time of a Doppler shift in the frequency of the signal received at the object from the emitter;
  - calculating, for a plurality of estimated bias corrections, a first derivative with respect to time of a Doppler shift in frequency of the signal;
  - comparing the plurality of calculated first derivatives to the determined first derivative and selecting one of the plurality of estimated bias corrections that corresponds to a best match of the plurality of calculated first derivatives to the determined first derivative; and
  - adjusting the estimated location of the object based on the selected one of the estimated bias corrections.

14. The system of claim 13, wherein the computer system is operable to determine, based on the signal, a first derivative with respect to time of instantaneous frequency shift by:
- converting the received signal into a coherent reference signal; and
- performing a fit to the instantaneous phase of the coherent reference signal.

15. The system of claim 13, wherein the computer system is further operable to calculate, for a plurality of bias corrections, a first derivative with respect to time of an instantaneous shift in frequency of the signal by calculating a first derivative based at least in part on a frequency drift correction factor indicative of the amount of drift of a carrier frequency of the emitter relative to a local oscillator frequency reference associated with the object.

* * * * *

UNITED STATES PATENT AND TRADEMARK OFFICE
CERTIFICATE OF CORRECTION

PATENT NO. : 7,477,986 B1 Page 1 of 2
APPLICATION NO. : 11/070549
DATED : January 13, 2009
INVENTOR(S) : Darrell L. Young It is certified that error appears in the above-identified patent and that said Letters Patent is hereby corrected as shown below:

Column 10:
Line 44, please delete

"
$$\hat{v}_x(t) = \int (a_x(t) + \alpha_x) dt + C_{x1}$$
$$\hat{x}(t) = \int \hat{v}_f(t) dt + C_{x2}$$

$$\hat{v}_y(t) = \int (a_y(t) + \alpha_y) dt + C_{y1}$$
$$\hat{y}(t) = \int \hat{v}_y(t) dt + C_{y2}$$

$$\hat{v}_z(t) = \int (a_z(t) + \alpha_z) dt + C_{z1}$$
$$\hat{z}(t) = \int \hat{v}_z(t) dt + C_{z2}$$
"

UNITED STATES PATENT AND TRADEMARK OFFICE
CERTIFICATE OF CORRECTION

PATENT NO. : 7,477,986 B1  
APPLICATION NO. : 11/070549  
DATED : January 13, 2009  
INVENTOR(S) : Darrell L. Young It is certified that error appears in the above-identified patent and that said Letters Patent is hereby corrected as shown below:

and insert
--

$$\hat{v}_x(t) = \int (a_x(t) + \alpha_x) dt + C_{x1}$$
$$\hat{x}(t) = \int \hat{v}_x(t) dt + C_{x2}$$

$$\hat{v}_y(t) = \int (a_y(t) + \alpha_y) dt + C_{y1}$$
$$\hat{y}(t) = \int \hat{v}_y(t) dt + C_{y2}$$

$$\hat{v}_z(t) = \int (a_z(t) + \alpha_z) dt + C_{z1}$$
$$\hat{z}(t) = \int \hat{v}_z(t) dt + C_{z2}$$

--.

Signed and Sealed this

Sixteenth Day of June, 2009

JOHN DOLL  
*Acting Director of the United States Patent and Trademark Office*